United States Patent
Gonzalez, Jr.

(10) Patent No.: US 6,282,733 B1
(45) Date of Patent: Sep. 4, 2001

(54) METHOD FOR INSTALLING A GRAY WATER RECLAMATION SYSTEM

(76) Inventor: Ismael Gonzalez, Jr., 8609 W. Golden La., Peoria, AZ (US) 85345

(*) Notice: Subject to any disclaimer, the term of this patent is extended or adjusted under 35 U.S.C. 154(b) by 0 days.

(21) Appl. No.: 09/640,854

(22) Filed: Aug. 17, 2000

Related U.S. Application Data (62) Division of application No. 09/143,625, filed on Aug. 28, 1998, now Pat. No. 6,139,729.

(51) Int. Cl.$^7$ .................................. E03B 9/00; E03C 1/00
(52) U.S. Cl. .............................. 4/665; 210/153; 210/767
(58) Field of Search ........................ 210/767, 153, 210/163, 164, 170, 257.1, 456, 420; 137/15.01; 4/665, 653

(56) References Cited

U.S. PATENT DOCUMENTS

| | | | |
|---|---|---|---|
| 4,162,218 | * | 7/1979 | McCormick . |
| 4,228,006 | * | 10/1980 | Hanna . |
| 4,349,436 | * | 9/1982 | Kaump . |
| 5,106,493 | * | 4/1992 | McIntosh . |
| 5,243,719 | * | 9/1993 | McDonald et al. . |
| 5,274,861 | * | 1/1994 | Ford . |
| 5,313,677 | * | 5/1994 | Coe . |
| 5,345,625 | * | 9/1994 | Diemand . |
| 5,406,657 | * | 4/1995 | Donati . |
| 5,498,330 | * | 3/1996 | Delle Cave . |
| 5,740,830 | * | 4/1998 | Mankins . |
| 6,139,729 | * | 10/2000 | Gonzalez, Jr. . |

* cited by examiner

Primary Examiner—Joseph W. Drodge
Assistant Examiner—Terry K. Cecil
(74) Attorney, Agent, or Firm—Parsons & Goltry; Robert A. Parsons; Michael W. Goltry (57) ABSTRACT

Described is a method for installing a gray water reclamation system in an existing plumbing infrastructure. A flexible conduit 26 is connected to the drain of a gray water source by moving the flexible conduit through an access 36 in the plumbing infrastructure and through the drainage conduit 41 to the drain where one end of the flexible conduit is coupled thereto. The other end of the flexible conduit is located adjacent the access and is in fluid communication with a filtration apparatus 27 and a storage vessel 28 so that the gray water may be filtered and then stored. A plumbing snake may be used to move the flexible conduit through the existing plumbing infrastructure.

10 Claims, 6 Drawing Sheets

METHOD FOR INSTALLING A GRAY WATER RECLAMATION SYSTEM

This application is a division of application Ser. No. 09/143,625, filed Aug. 28, 1998, now U.S. Pat. No. 6,139,729.

FIELD OF THE INVENTION

This invention relates generally to the field of reclamation systems and, more particularly, to gray water reclamation apparatus and methods of installing a gray water reclamation system.

BACKGROUND OF THE INVENTION

Household wastewater may be generally classified as either black water or gray water. Black water normally refers to waste water generated from toilets, whereas gray water normally refers to waste water generated from sinks, bath tubs, showers, dish washers and clothes washers. Because black water contains high levels of bacteria, it is not suitable for reuse before processing through a wastewater treatment facility. Yet gray water may be processed through a simple filtering system and reused for non-potable uses such as outdoor watering, car washing, etc.

The prior art is replete with gray water reclamation systems and apparatus. Although exemplary, known gray water reclamation systems and apparatus are very expensive, difficult if not impossible to install with existing household drainage or plumbing systems, complex and not very efficient.

Accordingly, it would be highly desirable to provide improved gray water reclamation apparatus and improved methods of installing a gray water reclamation system.

It is a purpose of the present invention to provide new and improved gray water reclamation apparatus that is easy to install during new household construction or renovation.

It is another purpose of the present invention to provide new and improved gray water reclamation apparatus that is easy to install with an existing household drainage or plumbing infrastructure or architecture.

It is still another purpose of the present invention to provide new and improved gray water reclamation apparatus that is highly efficient.

It is a further purpose of the present invention to provide new and improved gray water reclamation apparatus that is inexpensive.

It is still a further purpose of the present invention to provide new and improved gray water reclamation apparatus that is easy to use.

It is yet still a further provision of the present invention to conserve water in a cost efficient manner.

It is another purpose of the present invention to provide new and improved methods of installing a gray water reclamation system.

It is still another purpose of the present invention to provide new and improved methods of installing a gray water reclamation system that may be easily carried out during new household construction or renovation.

It is yet still another purpose of the present invention to provide new and improved methods of installing a gray water reclamation system that may be easily carried out with an existing household drainage or plumbing infrastructure.

SUMMARY OF THE INVENTION

The above problems and others are at least partially solved and the above purposes and others are realized in new and improved apparatus for reclaiming gray water. In a specific embodiment, apparatus of the present invention may comprise a source of gray water having a drain and a drainage conduit coupled with the drain in gray water communication. The source of gray water may include a sink, a bathtub, a shower, a dishwasher, a clothes washer, etc., and the drainage conduit may form part of a household drainage or plumbing infrastructure. The present invention further includes filter apparatus for filtering gray water into filtered gray water, a gray water conduit for receiving and conducting gray water from the drain to the filter apparatus, the gray water conduit extending from the drain and into and through at least a predetermined length of the drainage conduit intermediate the drain and the filter apparatus; and a vessel for receiving and storing filtered gray water from the filter apparatus.

The drainage conduit normally includes an inner diameter. The gray water conduit normally includes an outer diameter. In an exemplary embodiment, the outer diameter of the gray water conduit is less than the inner diameter of the drainage conduit at least at the predetermined length of the drainage conduit. In this regard, the gray water conduit, of which is preferably constructed of a substantially flexible material, may be easily housed and installed in the drainage conduit at least at the predetermined length thereof without obstructing normal operation of the drainage conduit.

A funnel may also be provided for conducting gray water from the drain of the gray water source to the gray water conduit. The funnel may include a first open end for receiving gray water from the source and a smaller second open end for conducting gray water into and through the proximal end of the gray water conduit. A grating may be provided and positioned for inhibiting debris from entering the proximal end of the gray water conduit. The funnel may also include at least one opening between the first open end and the smaller second open end for permitting gray water to conduct therethrough into the drainage conduit should the flow of gray water through the gray water conduit back up or otherwise become obstructed.

Consistent with the foregoing, associated methods of installing a gray water reclamation system may also be provided.

BRIEF DESCRIPTION OF THE DRAWINGS

The foregoing and further and more specific objects and advantages of the instant invention will become readily apparent to those skilled in the art from the following detailed description thereof taken in conjunction with the drawings in which.

DETAILED DESCRIPTION OF A PREFERRED EMBODIMENT

The present invention provides, among other things, new and improved gray water reclamation apparatus and methods of installing a gray water reclamation system. Ensuing embodiments of the present invention are easy and inexpensive to install during new household construction and with an existing plumbing infrastructure of a household. Because the present invention requires no re-plumbing of an existing household plumbing infrastructure, installation into an existing household plumbing infrastructure may be carried out quite expeditiously and at minimal expense.

Figure 1:
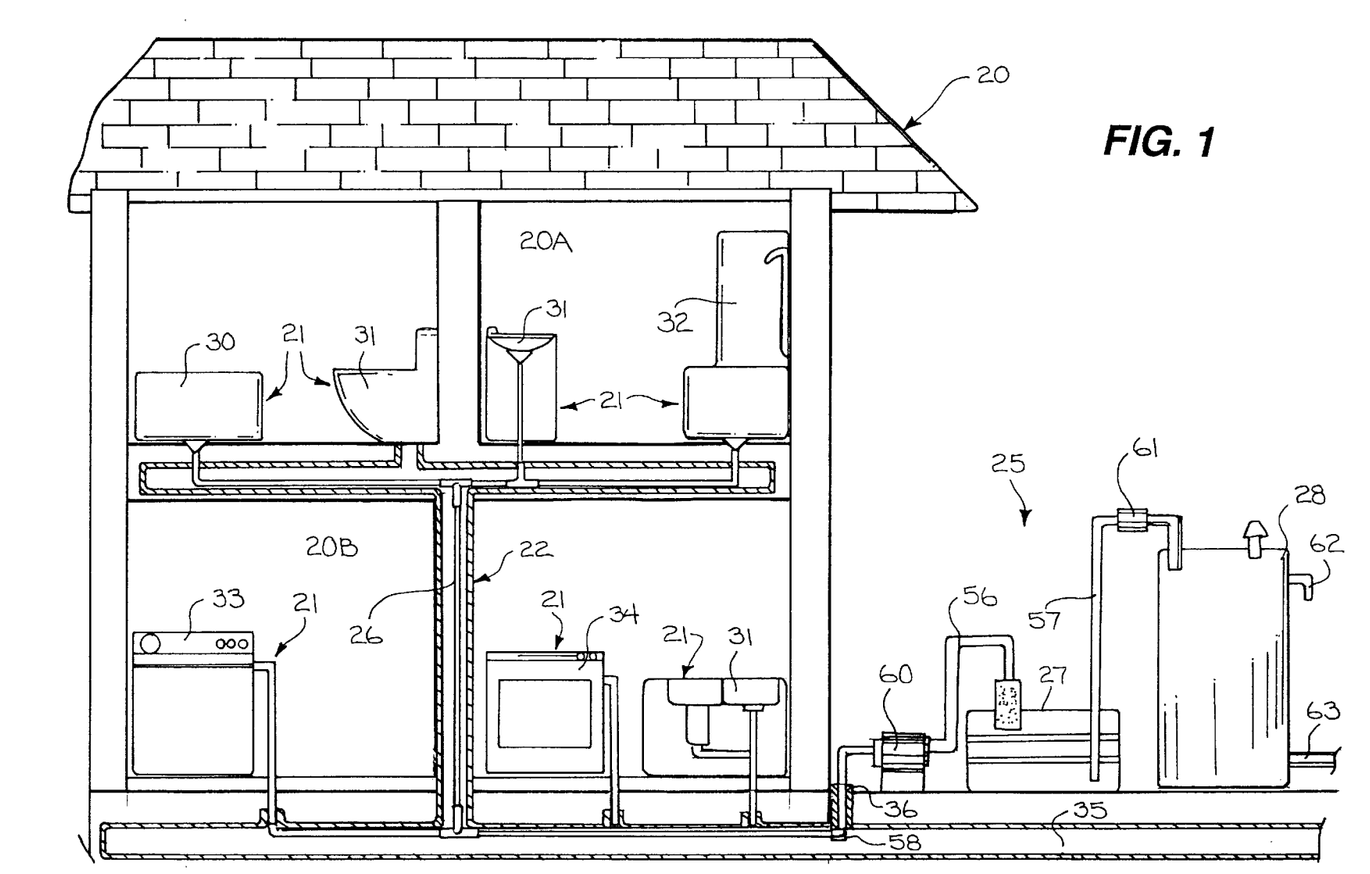
FIG. 1 illustrates a household having a plurality of sources of gray water each coupled with a plumbing infrastructure, and apparatus for reclaiming the gray water including a gray water conduit installed with the plumbing infrastructure for receiving gray water from one or more of the sources of gray water, a filter for receiving and filtering the gray water provided from the gray water conduit and a vessel for storing the filtered gray water.

Turning now to the drawings, in which like reference characters indicate corresponding elements throughout the several views, attention is first directed to FIG. 1 which illustrates a household 20 having a plurality of sources of gray water each being designated by the reference character 21 and coupled with a plumbing infrastructure 22 of household 20. Apparatus 25 for reclaiming the gray water includes a gray water conduit 26 installed with plumbing infrastructure 22 for receiving gray water from one or more of sources 21 of gray water, filter apparatus 27 for receiving and filtering the gray water provided from gray water conduit 26 and a storage tank or vessel 28 for storing the filtered gray water. In accordance with a conventional definition, gray water includes wastewater generated from sinks, bathtubs, showers, dish washers, clothes washers, etc. Because gray water contains little if any bacteria, it may be processed through a simple filtering system and reused for non-potable uses such as outdoor watering, car washing, etc. In this regard, one or more of sources 21 may include one or more of a bath tub 30, a sink 31 and a shower 32 as shown on upper level 20A of household, and a washing machine 33, a dishwasher 34 and sink 31 as shown on lower level 20B of household 20.

With continuing reference to FIG. 1, plumbing infrastructure 22 is generally comprised of a network of one or more drainage conduits that lead and normally conduct gray water from a drain of each source 21 to a main drainage conduit 35 that conducts the gray water into, for instance, the municipal wastewater system. The gray water conduit 26 of the present invention, however, is normally installed in the network of one or more drainage conduits comprising the household 20 plumbing infrastructure 22 and leads from one or more of the drains of one or more of the sources 21, into main drainage conduit 35 and outwardly from main drainage conduit 35 through an access 36 and to filter apparatus 27. In accordance with the present invention, gray water conduit 26 diverts gray water from the plumbing infrastructure 22 and main drainage conduit 35 and to filter apparatus 27 for filtering and subsequent storage in vessel 28 for future non-potable uses. As evinced in FIG. 1, access 36 is positioned at a location remote from sources 21.

Access 36 leading to main drainage conduit 35 is shown, in this specific example, just outside of household 20. Access 36 is a conventional feature normally found as part of the plumbing infrastructure in conventional household construction, and allows workers to gain entrance into main drainage conduit 35 and plumbing infrastructure 22 for repairs, maintenance, etc. Accesses, like access 36, may also be possibly found housed inside a household as well.

Figure 2:
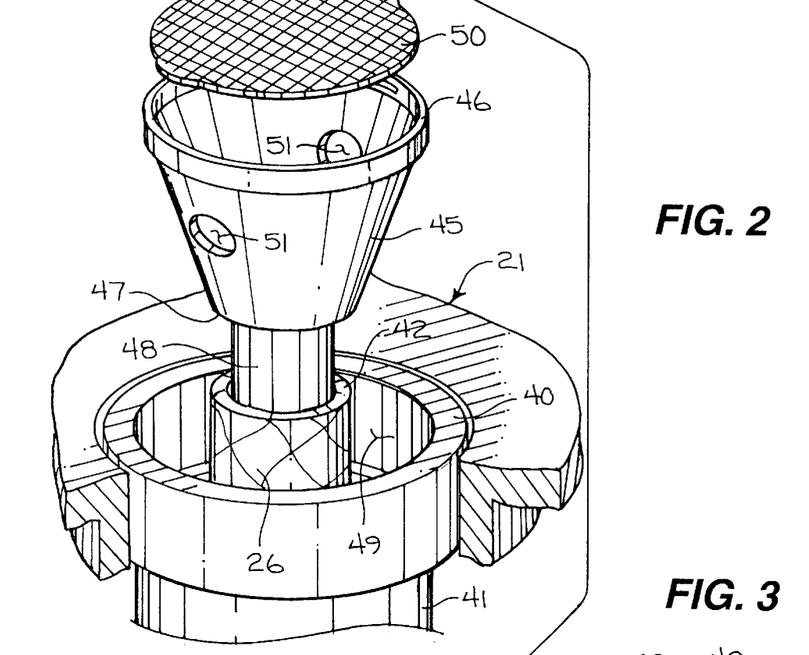
FIG. 2 illustrates a fragmented view of a source of gray water having a drain for receiving gray water, a drainage conduit coupled with and leading away from the drain and a gray water conduit having a funnel for diverting gray water away from the drainage conduit to the gray water conduit.
Figure 3:
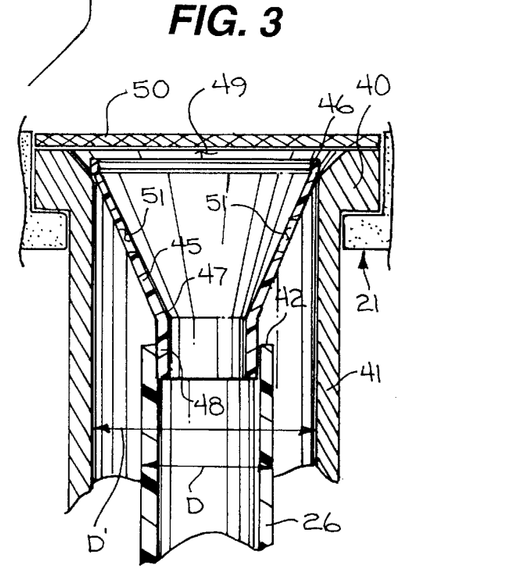
FIG. 3 illustrates a vertical sectional view of the gray water conduit, drain and drainage conduit of FIG. 2 shown as they would appear assembled.

FIG. 2 illustrates a fragmented view of a source 21 of gray water having a drain 40 bounding an opening 49 for receiving gray water, and a drainage conduit 41 coupled with and leading away from drain 40 for normally conducting gray water into and through plumbing infrastructure 22 of household 20 in FIG. 1. Drainage conduit 41 is generally intended to be part of plumbing infrastructure 22. Housed in drainage conduit 41 is gray water conduit 26 having a proximal end 42 positioned in and at drain 40. Further included is a funnel 45 having a first open end 46, a smaller second open end 47 and a substantially cylindrical sleeve 48 extending outwardly from second open end 47. Sleeve 48 is sized for close receipt and engagement when inserted into proximal end 42 of gray water conduit 26 as also shown in FIG. 3. Regarding FIG. 3, first open end 46 of funnel 45 is sized substantially to encompass opening 49 of drain 40. First open end 46 is further sized to rest against drain 40 at or otherwise adjacent opening 49. With first open end 46 of funnel 45 sized to rest against drain 40 at or otherwise adjacent opening 49 and with sleeve 48 closely received into and through proximal end 42 of gray water conduit 26, funnel 45 functions to couple proximal end 42 of gray water conduit with drain 40 in gray water communication. In this regard, although gray water would normally enter drainage conduit 41 from opening 49 of drain 40, funnel 45 diverts gray water from opening 49 of drain 40 through first open end 46 to smaller second open end 47 and outwardly from sleeve 48 through proximal end 42 and into gray water conduit 26 for communication to filter apparatus 27 shown in FIG. 1. Those of ordinary skill will appreciate that funnel 45 may be fastened, either detachably or immovably, at or otherwise adjacent opening 49 of drain 40 as desired in any conventional or suitable manner so that funnel 45 may operate to divert gray water from drain 40 to gray water conduit 26.

To inhibit debris or large particles from entering proximal end 42 of gray water conduit 26, a grating 50 may be provided and positioned to overly opening 49 of drain 40 and, at the least, first open end 46 of funnel 45. However, in the event one of second open end 47 of funnel 45, sleeve 48 and gray water conduit become obstructed or otherwise incapable of accommodating the flow of gray water therethrough, funnel 45 includes openings 51 formed intermediate first open end 46 and second open end 47 for permitting gray water to pass therethrough for receipt into drainage conduit 41. To permit gray water to easily pass into and through drainage conduit 41 with gray water conduit 26 installed therein, and to facilitate ease of installation of gray water conduit 26 into and through drainage conduit 41 and through, for instance, the network of drainage conduits comprising plumbing infrastructure 22, of which will be presently discussed, gray water conduit 26 includes an outer diameter D substantially less than an inner diameter D' of drainage conduit 41 as clearly shown in FIG. 3. For the purposes of discussion, diameter D' is generally intended also to define the diameter of any one or more of the drainage conduits of the network of drainage conduits comprising plumbing infrastructure 22 of household 20 through which gray water conduit 26 may be installed. Furthermore, although funnel 45 is shown having two openings 51, less or more may be used if desired.

Figures 4, 5:
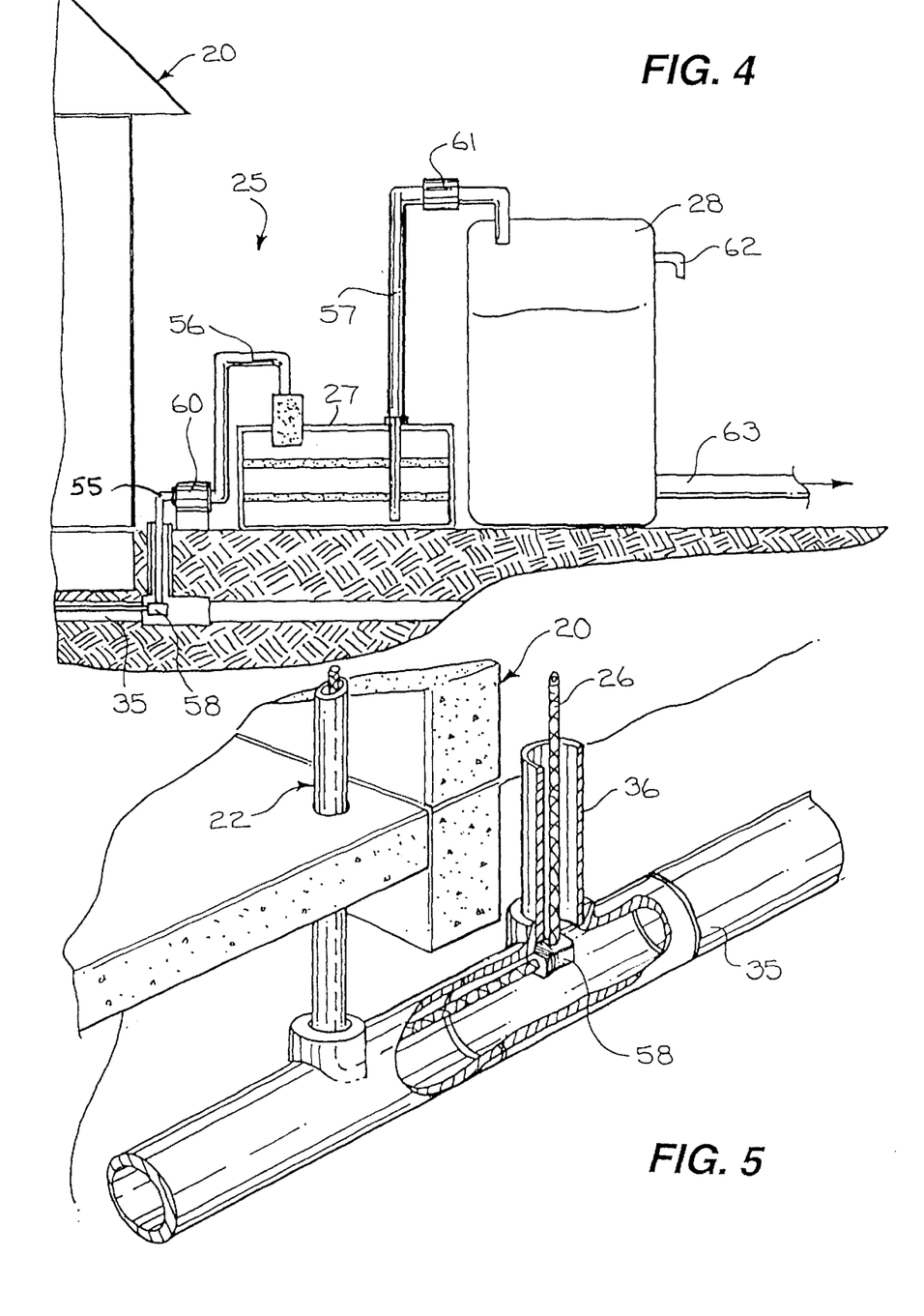
FIG. 4 illustrates a side elevational view of the filter apparatus and vessel of FIG. 1.
FIG. 5 illustrates a fragmented perspective view of the gray water conduit of FIG. 1 shown as it would appear installed in the plumbing infrastructure of the household, portions of the plumbing infrastructure shown broken away for the purposes of illustration.
Figures 9, 10:
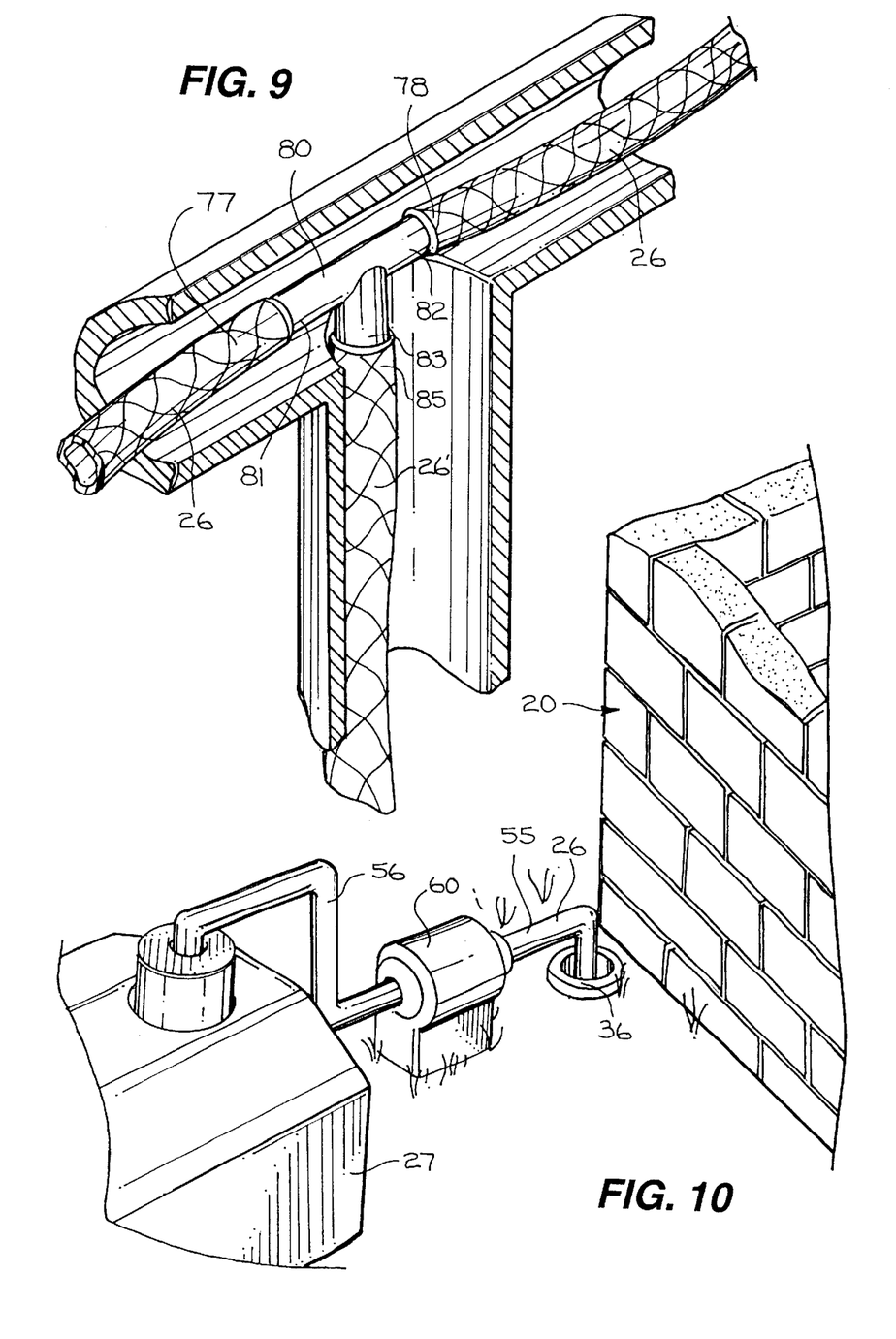
FIG. 9 illustrates a fragmented perspective view of the connector of FIG. 8 shown as it would appear interconnecting ends of a plurality of gray water conduits positioned in a drainage conduit of, for instance, the plumbing infrastructure of the household of FIG. 1, portions of the drainage conduit being broken away for the purposes of illustration.
FIG. 10 illustrates the gray water conduit of FIG. 1 leading from an access to the plumbing infrastructure and to the filter apparatus.

From funnel 45 gray water conduit extends into and through one or more of the drainage conduits comprising plumbing infrastructure 22 of household 20 as shown in FIG. 1, into and through main drainage conduit 35 and outwardly from main drainage conduit 35 to or through access 36 terminating generally with a distal end 55 as shown in FIGS. 4 and 10. With continuing reference to FIGS. 4 and 10, distal end 55 is coupled in gray water fluid communication with filter apparatus 27 via fluid line 56, and filter apparatus 27 is coupled in filtered gray water communication with vessel 28 via fluid line 57 (vessel 27 and fluid line 57 not shown in FIG. 10). In this manner of orientation, gray water from distal end 55 of gray water conduit 26 conducts into and through fluid line 56 of which is then pumped via a conventional pump 60 for receipt into filter apparatus 27 for filtering into filtered gray water. To prevent the gray water from backing up between distal end 55 of gray water conduit 26 and filter apparatus 27, fluid line 56 may be provided with a conventional check valve (not shown) if desired. After filtering, the filtered gray water is pushed into vessel 28 via pump 60 along fluid line 57 between filter apparatus 27 and vessel 28 as shown in FIG. 4 for storage in vessel 28. To prevent the filtered gray water from backing up between pump 60 and vessel, fluid line 57 may be provided with a conventional check valve 61 intermediate pump 60 and vessel 28 if desired.

In a particular embodiment, pump 60 may be provided as a readily available conventional electrical water pump. Although pump 60 may be actuated for continuous running, a conventional fluid or fluid pressure sensitive switch 58 (shown in FIGS. 1 and 5) may be coupled with gray water conduit 26 upstream of pump 60 and coupled to pump 60 in electrical signal communication. In this regard, should gray water flow through gray water conduit 26 and pass into contact with switch 58, switch 58 will turn on pump 60 in response to sensing the flow of gray water conduit therethrough or thereby to allow pump 60 to pump and push water through filter apparatus 27 for filtering and for eventual receipt into vessel 28 for storage.

Filter apparatus 27 is a conventional and well-known single or multiple stage system, details of which will not be herein discussed as they will readily occur to the skilled artisan. Vessel 28 is also of conventional construction and includes an overflow valve 62 for releasing filtered gray water when it becomes to full and a fluid line 63 for allowing users access to the filtered or reclaimed gray water for non-potable uses.

Figure 7:
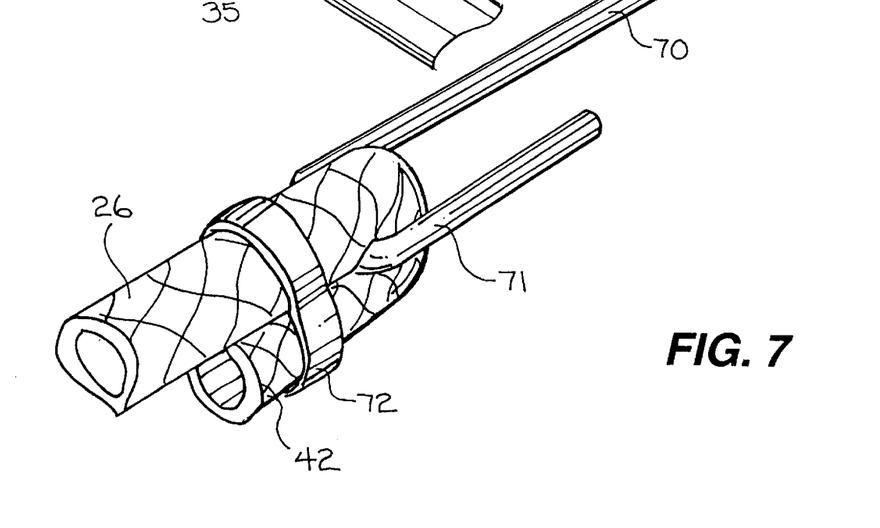
FIG. 7 illustrates a fragmented perspective view of a snake coupled with the gray water conduit of FIG. 1, the snake operative for allowing a user to draw the gray water conduit into and through the plumbing infrastructure of the household.

To install apparatus 25 into plumbing infrastructure 22 of household 20, a user may (1) access a given drain of one of the sources 21 of gray water, (2) provide a snake 70 as shown in FIG. 7, (3) insert an end 71 of snake 70 through the drain and, by pushing snake 70, (4) move end 71 into and through one or more of the network of drainage conduits comprising plumbing infrastructure 22 for receipt by access 36. Snake 70 is flexible for allowing it to easily conduct through plumbing infrastructure 22 as needed, and is constructed in accordance with conventional and well known snake apparatus, further details of which will not be further addressed as they will readily occur to the skilled artisan.

To continue the installation, a user may then (5) fasten or couple end 71 of snake 70 with gray water conduit 26 at, proximate or otherwise adjacent proximal end 42 thereof and then (6) move snake 70 back through plumbing infrastructure by pulling it to move or pull end 71 and gray water conduit 26 through one or more of the drainage conduits comprising plumbing infrastructure 22 and to the drain. Once at the drain, the user may then (7) couple proximal end 42 with the drain in gray water communication with, for instance, funnel 45 consistent with the preceding discussion of FIGS. 2 and 3, and (8) couple distal end 55 of gray water conduit 26 in fluid communication with filter apparatus 27 and vessel 28 of which may be provided and installed either outside of household 20 or inside of household 20 if so desired.

Figure 6:
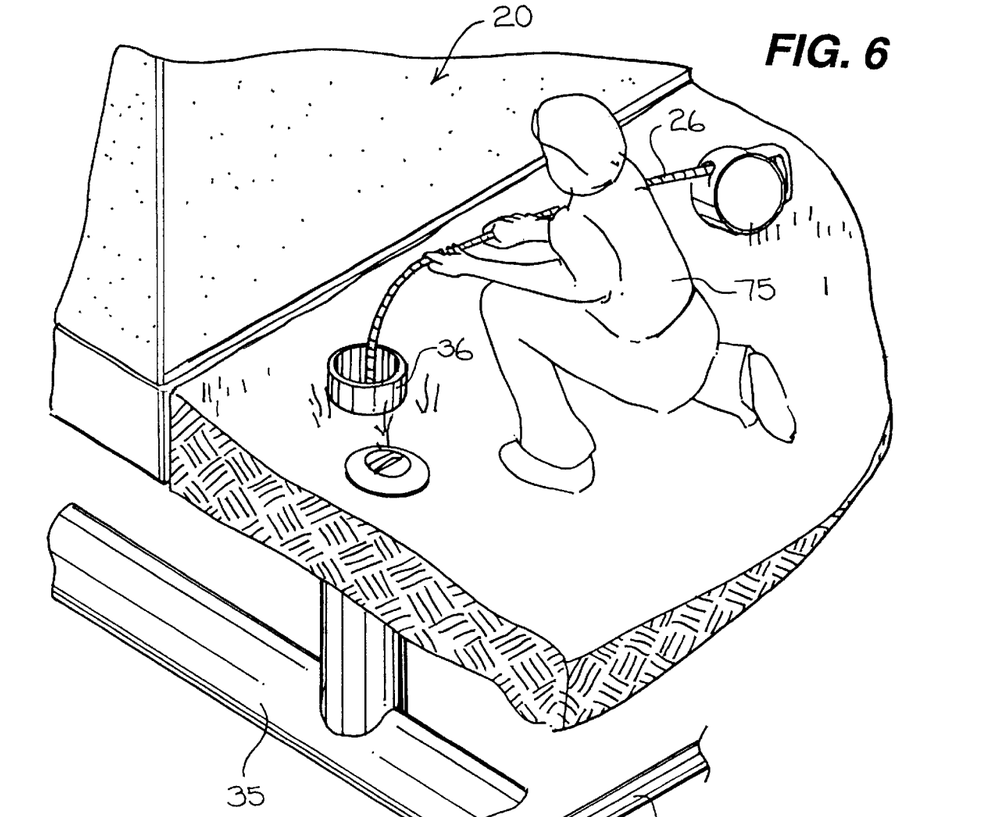
FIG. 6 illustrates a user feeding the gray water conduit of FIG. 1 into an access leading to the plumbing infrastructure of the household.

To fasten or otherwise couple end 71 of snake 70 at, proximate or otherwise adjacent proximal end 42 of gray water conduit 26, end 71 may be provided as hooked, gray water conduit 26 looped around the hooked portion of end 71 and then gray water conduit 26 fastened to itself in the form of a loop with, for instance, a clamp or, as shown, a flexible belt 72, of which may be removed or cut away prior to coupling proximal end 42 with a given drain in gray water communication via funnel 45 as previously discussed. In order to permit gray water conduit 26 to easily conduct into and through plumbing infrastructure 22 as needed, it not only has an outer diameter D substantially less than the outer diameter D' of any one or more of the network of drainage conduits comprising plumbing infrastructure 22, it is also constructed of a highly flexible tubing material such as a braided vinyl or synthetic fiber material having, for instance, an internal layer of plasticized polyvinyl chloride. Furthermore, to increase ease of installing gray water conduit 26, and with attention directed to FIG. 6, a user 75 may feed gray water conduit 26 into and through access 36 as another user pulls snake 70 to correspondingly pull gray water conduit 26 attached thereto into and through plumbing infrastructure 22 (not shown in FIG. 6) at a given drain.

Figure 8:
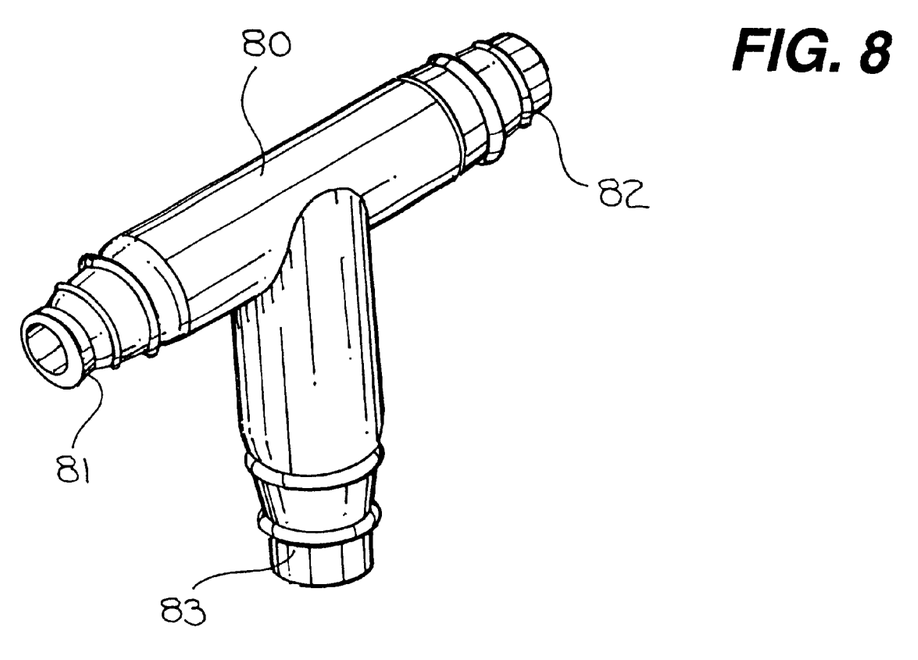
FIG. 8 illustrates a connector for interconnecting ends of a plurality of gray water conduits.

Once a gray water conduit 26 has been installed with a given source 21 of gray water and apparatus 25 is in use, it may be desirable to expand apparatus 25 to reclaim gray water from one or more additional sources 21 of gray water. To this end, a user may (1) access a drain of a specific source 21 of gray water not coupled with apparatus 25, (2) insert, for instance, end 71 of snake 70 (FIG. 7) into the drain and into and through one or more of the drainage conduits comprising plumbing infrastructure 22, (3) engage, such as by hooking engagement, end 71 of snake 70 with gray water conduit 26 and (4) pull gray water conduit 26 toward and into and through the drain of the source 21. The user may then (5) sever the gray water conduit 26 to form free ends 77 and 78 as shown substantially in FIG. 9. With a fluid connector such as, as shown in FIG. 8, a hollow T-shaped connector 80 having opposed longitudinal ends 81 and 82 and a vertical end 83, the user may (6) fasten free ends 77 and 78 with, for instance, longitudinal ends 81 and 82, (7) fasten a free end 85 of another gray water conduit 26' to vertical end 83, (8) push connector 80 and free end 85 of the other gray water conduit 26' into and through the drain, and then (9) couple another free end of the other gray water conduit 26' with the drain in gray water fluid communication with funnel 45 (not shown in FIG. 9) in accordance with the preceding discussion of FIGS. 2 and 3. To interconnect free ends 77, 78 and 85 with connector 80 in fluid communication, longitudinal ends 81 and 82 and vertical end 83 may be sized and inserted into free ends 77, 78 and 85, respectively, for sealing engagement.

The foregoing process for expanding apparatus 25 may be repeated as necessary in accordance with specific needs. To this end, varying shapes of connectors such as straight, L-shaped or X-shaped connectors may be provided and used as needed. Connectors, such as connector 80, may be either sized or constructed of a substantially flexible material like gray water conduit 26 to permit easy admittance through the drain of a source of gray water and into and through one or more of the drainage conduits comprising plumbing infrastructure 22.

To install a network of gray water conduits 26 into plumbing infrastructure 22 for allowing gray water to be diverted away from a selected plurality of the sources 21 of gray water, a user may (1) access the drains of a plurality of the sources 21 of gray water, (2) provide a snake 70 as shown in FIG. 7, (3) insert an end 71 of snake 70 through one of the drains of the sources 21 and, by pushing snake 70, (4) move end 71 into and through one or more of the network of drainage conduits comprising plumbing infrastructure 22 for receipt by access 36. A user may then (5) fasten or couple end 71 of snake 70 with a first gray water conduit at, proximate or otherwise adjacent a proximal end thereof and then (6) move snake 70 back through plumbing infrastructure by pulling it to move or pull end 71 and the first gray water conduit through one or more of the drainage conduits comprising plumbing infrastructure 22 and to the drain.

A user may then (7) access another drain of the plurality of the sources 21 of gray water, (8) provide a snake 70 as shown in FIG. 7, (9) insert an end 71 of snake 70 through the other one of the drains of the sources 21 and, by pushing snake 70, (10) move end 71 into and through one or more of the network of drainage conduits comprising plumbing infrastructure 22 for receipt by access 36. A user may then (11) fasten or couple end 71 of snake 70 with a second gray water conduit at, proximate or otherwise adjacent a proximal end thereof and then (12) move snake 70 back through plumbing infrastructure by pulling it to move or pull end 71 and the second gray water conduit through one or more of the drainage conduits comprising plumbing infrastructure 22 and to the other drain. With the distal ends of each of the first and second gray water conducts located at or adjacent access 36, a user may then (13) fasten the distal ends of the first and second gray water conduits together in fluid communication with a connector, such as connector 80, (15) fasten a proximal end of a third gray water conduit in fluid communication with the distal ends of the first and second gray water conduits via, for instance, connector 80, and then (16) pull the first and second gray water conduits at each drain of the selected ones of the sources 21 of gray water to pull the connector and the third gray water conduit into the plumbing infrastructure. The proximal ends of the first and second gray water conduits may each then be (17) fastened in fluid communication with a respective drain of a respective source, and the distal end of the third gray water conduit (18) coupled in fluid communication with filter apparatus 27 as previously described.

In summary, the present invention provides exemplary gray water reclamation apparatus and associated methods of installing a gray water reclamation system. Those having regard toward the relevant art will appreciate that the foregoing exemplary embodiments are easy and inexpensive to install with an existing plumbing infrastructure or architecture and require no re-plumbing. In this regard, it is important for gray water conduit 26 to not only be housed in the plumbing infrastructure 22, but also for it to extend from a given drain of a source 21 of gray water into and through at least a predetermined length of one or more of the drainage conduits comprising the plumbing infrastructure 22 of the household prior to coupling with filter apparatus 27. Thus, gray water conduit 26 may extend through plumbing infrastructure 22 from a given drain and either terminate with distal end 55 at access 36 to be completely housed in the plumbing infrastructure 22, or terminate with distal end 55 outside of access 36 to be at least partially housed in the plumbing infrastructure 22. Should distal end 55 of gray water conduit 26 terminate at or in access 36, fluid line 56 may be coupled directly to access 36 if so desired.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. In a system including a source of gray water having a drain, a drainage conduit coupled with the drain in fluid communication and an access to the drainage conduit remote from the source, a method of installing a gray water reclamation system, the method comprising the steps of:

providing an elongated flexible conduit having a proximal end and a distal end;

moving the proximal end of the elongate flexible conduit into and through the access and the drainage conduit;

locating the proximal end of the elongate flexible conduit adjacent the drain;

locating the distal end of the elongate flexible conduit adjacent the access;

coupling the proximal end of the elongate flexible conduit with the drain in gray water communication, the elongate flexible conduit for receiving and conducting gray water from the drain to the distal end;

providing a filtration apparatus in fluid communication with said elongate flexible conduit to produce filtered gray water; and providing a storage vessel in fluid communication with said filtration apparatus for storing the filtered gray water.

2. The method of claim 1, wherein the step of moving the proximal end of the elongate flexible conduit into and through the access and the drainage conduit further includes the steps of:

providing an elongate flexible snake having a free end;

moving the free end of the elongate flexible snake into and through the drain, the drainage conduit and the access;

coupling the free end of the snake with the elongate flexible conduit adjacent the proximal end thereof; and moving the free end of the elongate flexible snake into and through the access and the drainage conduit to adjacent the drain.

3. The method of claim 2, wherein the step of moving the free end of the elongate flexible snake into and through the drain, the drainage conduit and the access further includes the step of pushing the snake through the drain, the drainage conduit and the access.

4. The method of claim 2, wherein the step of moving the free end of the elongate flexible snake into and through the access and the drainage conduit to adjacent the drain further includes the step of pulling the snake through the access and the drainage conduit to adjacent the drain.

5. The method of claim 1, wherein the step of coupling the proximal end of the elongate flexible conduit with the drain in gray water communication further includes the steps of:

provyling funnel having a first open end and a smaller second open end;

coupling the second smaller open end with the proximal end of the elongate flexible conduit; and locating the first open end adjacent the drain.

6. The method of claim 5, further including the step of coupling the funnel in gray water communication with the drainage conduit.

7. The method of claim 6, wherein the step of coupling the funnel in gray water communication with the drainage conduit further includes the step of providing the funnel with at least one opening intermediate the first open end and the smaller second open end.

8. The method of claim 1, wherein the step of providing a filtration apparatus in fluid communication with said elongate flexible conduit to produce filtered gray water further includes the step of:

coupling the filtration apparatus with the distal end of the elongate flexible conduit.

9. The method of claim 1, wherein the step of providing a storage vessel in fluid communication with said filtration apparatus for storing the filtered gray water further includes the step of:

coupling the storage vessel in filtered gray water communication with the filtration apparatus.

10. In a system including sources of gray water each having a drain, a plumbing infrastructure coupled with the drains in fluid communication and an access to the plumbing infrastructure remote from the source, a method of installing a gray water reclamation system, the method comprising the steps of:

providing first, second and third elongate flexible conduits each having a proximal end and a distal end;

coupling the first and second elongate flexible conduits together in fluid communication at each distal end;

coupling the proximal end of the third elongate flexible conduit in fluid communication with each distal end of the first and second elongate flexible conduits;

moving the proximal ends of the first and second elongate flexible conduits into and through the access and the plumbing infrastructure;

locating the proximal end of each of the first and second elongate flexible conduits adjacent a selected one of the drains, respectively;

locating the distal end of the third elongate flexible conduit adjacent the access;

coupling the proximal end of each of the first and second elongate flexible conduits with the selected one of the drains, respectively, in gray water communication, the first and second elongate flexible conduits for receiving and conducting gray water from the drain to the proximal end of the third gray water conduit and the third gray water conduit for conducting the gray water to the distal end thereof;

coupling a filtration apparatus in gray water communication with the distal end of the third gray water conduit to produce filtered gray water; and coupling a storage vessel to the filtration apparatus to store the filtered gray water.

* * * * *